US006077582A

United States Patent [19]

Yoshimura et al.

[11] Patent Number: 6,077,582

[45] Date of Patent: Jun. 20, 2000

[54] OPTICAL DISC, PROCESS FOR PRODUCING THE OPTICAL DISC AND ITS MANUFACTURING APPARATUS

[75] Inventors: Yoshiki Yoshimura, Wakayama; Takashi Sakurai, Haga-gun; Shinji Moriyama, Wakayama; Ikuo Takahashi, Haga-gun; Yutaka Kanamaru, Wakayama; Tutomu Akashi; Kazuhiko Sugawara, both of Haga-gun, all of Japan

[73] Assignee: Kao Corporation, Tokyo, Japan

[21] Appl. No.: 09/000,204

[22] PCT Filed: May 30, 1997

[86] PCT No.: PCT/JP97/01865

§ 371 Date: Feb. 3, 1998

§ 102(e) Date: Feb. 3, 1998

[87] PCT Pub. No.: WO97/47004

PCT Pub. Date: Nov. 12, 1997

[30] Foreign Application Priority Data

Jun. 3, 1996 [JP] Japan .................................... 8-160497
Dec. 3, 1996 [JP] Japan .................................... 8-338941

[51] Int. Cl.[7] ........................................................ B32B 3/00

[52] U.S. Cl. ....................... 428/64.1; 428/64.2; 428/64.4; 428/64.8; 428/913; 430/270.11; 430/495.1; 430/945; 369/283; 369/288

[58] Field of Search ................................. 428/64.1, 64.2, 428/64.4, 64.8, 457, 913; 430/270.11, 495.1, 945; 369/283, 288

[56] References Cited

U.S. PATENT DOCUMENTS

| | | | |
|---|---|---|---|
| 5,470,691 | 11/1995 | Arai et al. | 430/273 |
| 5,549,952 | 8/1996 | Arai et al. | 428/64.4 |
| 5,573,831 | 11/1996 | Suzuki et al. | 428/64.1 |
| 5,616,450 | 4/1997 | Arai et al. | 430/321 |

FOREIGN PATENT DOCUMENTS

| | | |
|---|---|---|
| 0 628 956 | 12/1994 | European Pat. Off. . |
| 7-1865 | 7/1995 | Japan . |
| 7-330836 | 12/1995 | Japan . |
| 8-102090 | 4/1996 | Japan . |

OTHER PUBLICATIONS

Patent Abstracts of Japan. Method and Apparatus For Producing Optical Disk, Jun. 18, 1987, vol. 011, No. 189 (P–587).

Patent Abstracts of Japan. Manufacture of Optical Disk And Its Device, Mar. 26, 1987, vol. 011, No. 097 (P–560).

Patent Abstracts of Japan. Image Forming Method To Optical Recording Medium, Sep. 22, 1993, vol. 017, No. 529 (P–1618).

Patent Abstracts of Japan. Recording Medium, Jan. 26, 1984, vol. 008, No. 018 (P–250).

Patent Abstracts of Japan. Optical Recording Medium, Jan. 14, 1983, vol. 007, No. 010 (P–168).

Patent Abstracts of Japan. Production of Optical Information Medium, Aug. 30, 1996, vol. 096, No. 008.

Patent Abstracts of Japan. Optical Information Medium, Aug. 30, 1996, vol. 096, No. 008.

Patent Abstracts of Japan. Production of Optical Disk, Nov. 30, 1995, vol. 095, No. 010.

Patent Abstracts of Japan. Optical Information Medium, Jun. 30, 1995, vol. 095, No. 005.

Patent Abstracts of Japan. Optical Disk Manufacturing Device, Dec. 11, 1992, vol. 016, No. 571 (P–1459).

Patent Abstracts of Japan. Optical Disk, Mar. 23, 1993, vol. 017, No. 143 (P–1507).

*Primary Examiner*—Elizabeth Evans
*Attorney, Agent, or Firm*—Oblon, Spivak, McClelland, Maier & Neustadt, P.C.

[57] ABSTRACT

An optical disc comprising a disc having a signal- recording layer, wherein a treated layer having a surface electric resistance of from $1\times10^3$ to $1\times10^{13}$ Ω is formed on the signal-recording layer, and the surface of the treated layer is subjected to electrophotographic printing. The optical disc can be desirably used as an optical disc, in which digital signals can be recorded, reproduced or erased, such as a digital audio disc, such as a compact disc, a video disc, or a CD-ROM.

15 Claims, 4 Drawing Sheets

8
8 f
8 e
8 c
8 b
8 a

OPTICAL DISC, PROCESS FOR PRODUCING THE OPTICAL DISC AND ITS MANUFACTURING APPARATUS

TECHNICAL FIELD

The present invention relates to an optical disc, a method for producing the same and an apparatus for manufacturing the same, and more particularly to an optical disc, in which digital signals can be recorded, reproduced or erased, such as a digital audio disc, such as a compact disc, a video disc, or a CD-ROM, a method for producing the same, and an apparatus for manufacturing the same.

BACKGROUND ART

Label printing of an optical disc has been conventionally carried out by a screen printing method or an offset printing method using a UV-curable ink. However, these printing methods require a plate-forming process for preparing engraved plates using numerous kinds of devices as a preparation process for printing. Therefore, there arises a defect that their production efficiency is low and the process is intricate.

Accordingly, as a method for shortening the period of time necessitated for the process and simplifying the printing device, thereby solving the above defect of the printing method, there have been proposed (A) an apparatus for electrifying the surface on which images are printed to the polarity opposite from the polarity of a toner by scorotron; applying a high voltage from the reverse side of a supporting member for toner images, such as a transfer drum or a transfer belt to electrify the surface to the same polarity as the toner, to easily peel off the toner from the supporting member for toner images; and applying a high voltage having a polarity opposite from the polarity of the toner from the reverse side of an object to be printed, thereby transferring the images to the object to be printed (Japanese Patent Laid-Open No. Hei 5-212857); and (B) a method for producing an optical disc comprising forming a printing film made of fine particles, such as toners on the reflection film formed by vapor depositing a metal, such as gold or aluminum on the recording surface of a disc substrate made of a resin, such as polycarbonates by means of electrophotography; and forming a protective film made of a resin such as a UV-curable resin on the printing film for protecting the printing film (Japanese Patent Laid-Open No. Hei 7-169096).

However, in the method (A) described above, since the voltage supplied to a charge supplying device must be made high, it is apprehensive that disadvantageous effects may be imparted to the disc. Moreover, there arises a defect that the electrically uniform transferring of the toner images to the surface of the optical disc is made difficult.

In addition, in the method (B) described above, since the thickness of the optical disc is usually 1 mm or so, there arises a defect that the electrically uniform transferring of the toner images to the surface of the optical disc is made difficult, nevertheless charges necessitated for the toner are supplied from the reverse of the surface for printing of the object to be printed before the formation of an antioxidation layer, which is provided for preventing the oxidation of the reflective film, on the surface of the disc substrate of the optical disc.

In view of the prior art mentioned above, objects of the present invention are to provide an optical disc to which toner images are electrically uniformly transferred by electrophotography, a method for producing the same and an apparatus for manufacturing the same.

DISCLOSURE OF INVENTION

According to the present invention, there are provided:

(A) An optical disc comprising a disc having a signal-recording layer, wherein a treated layer having a surface electric resistance of from $1\times10^{13}$ to $1\times10^{3}$ Ω is formed on the signal-recording layer, and the surface of the treated layer is subjected to electrophotographic printing;

(B) A method for producing an optical disc, comprising forming a treated layer having a surface electric resistance of from $1\times10^{13}$ to $1\times10^{3}$ Ω on the signal-recording layer of the disc having a signal-recording layer, and subjecting the treated layer to electrophotographic printing; and (C) An apparatus for manufacturing an optical disc, comprising a treated layer-forming apparatus for forming a treated layer on the signal-recording layer of a disc having a signal-recording layer, and an electrophotographic printer for subjecting the surface of the treated layer to electrophotographic printing.

BEST MODE FOR CARRYING OUT THE INVENTION

Figure 1:
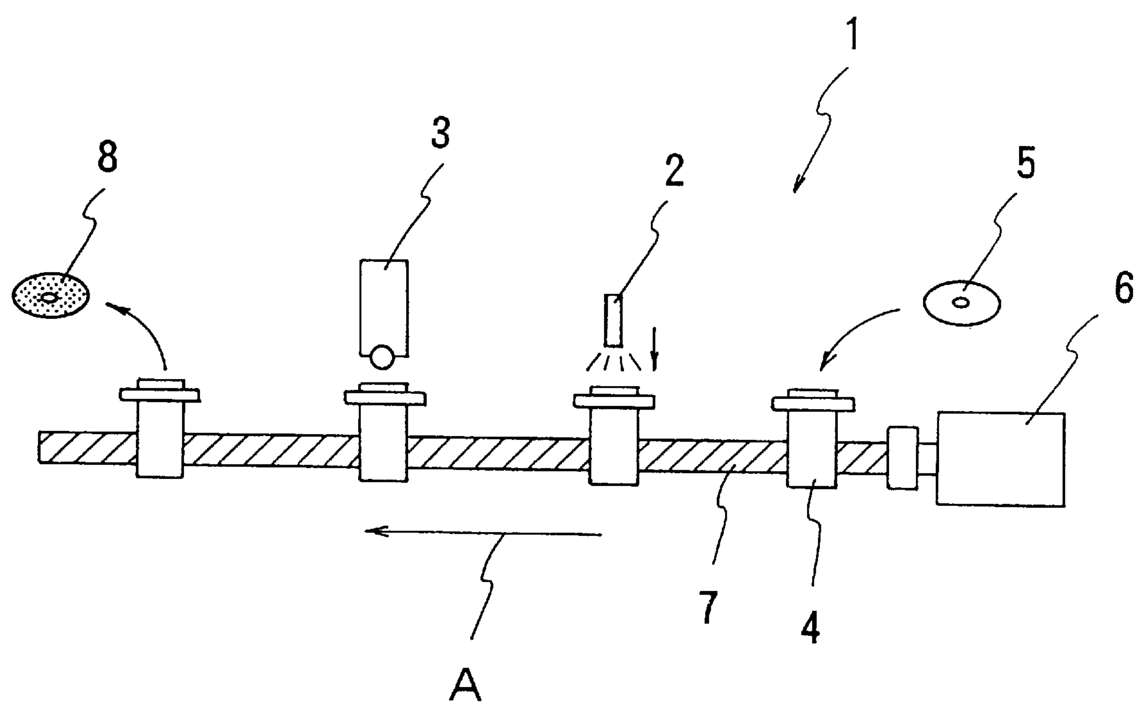
FIG. 1 is a schematic view showing one embodiment of an apparatus for manufacturing an optical disc which can be used for the method for producing an optical disc of the present invention.

According to the method for producing an optical disc of the present invention, an optical disc can be obtained by forming a treated layer having a surface electric resistance of from $1\times10^{13}$ to $1\times10^{3}$ Ω on the signal-recording layer of the disc having a signal-recording layer, and subjecting the treated layer to electrophotographic printing.

Examples of the substrates which can be used in the disc include, for instance, disc substrates made of a light transmittable resin, such as polycarbonates.

The disc has a signal-recording layer. In the method for forming the signal-recording layer, there are no particular limitation, and any of conventional methods can be employed.

Examples of the optical discs having the signal- recording layer include, for instance, CD-ROM produced by recording a signal in a resin substrate made of a resin such as a polycarbonate during its molding, and forming thereon a signal layer, which can retrieve the signal by a reflective layer made of a metal, such as aluminum; and CD-R, in which signals can be written, produced by forming a signal-recording layer made of organic pigments, such as cyanine and phthalocyanine, or a phase-changing material such as GbSbTe.AgInSbTe, and the like.

Reflective layers of metals, such as aluminum, may be formed on the signal-recording layer by such methods as vacuum deposition methods and sputtering methods. The thickness of the reflective layer is not particularly limited, and the thickness may be usually from about 50 to about 100 nm. In this case, a treated layer can be provided on the reflective layer.

In addition, a protective layer may be formed on the reflective layer in order to prevent the oxidation by applying a resin such as a UV-curable acrylic resin to the reflective layer, using a spin coater method, and curing the UV-curable acrylic resin. The thickness of the protective layer is not particularly limited, and the thickness may be usually from about 2 to about 15 $\mu$m. In this case, a treated layer can be provided on the reflective layer.

The size and the thickness of the disc are not particularly limited. In one embodiment, the diameter is from 80 to 300 mm or so, and the thickness is from 0.5 to 1.5 mm or so.

In the optical disc of the present invention, one of the remarkable features resides in that a treated layer having a surface electric resistance of from $1\times10^{13}$ to $1\times10^{3}$ Ω is formed on the signal-recording layer of the disc.

In the method for producing the optical disc of the present invention, since the treated layer is provided as described above, excellent characteristics of being able to uniformly and electrically transfer toner images to the disc by means of electrophotography can be exhibited.

In the present invention, in order to make it possible to uniformly and electrically transfer the toner images to the disc by means of electrophotography, the surface electric resistance of the treated layer is adjusted to $1\times10^{13}$ to $1\times10^{3}$ Ω, preferably $1\times10^{12}$ to $1\times10^{4}$ Ω.

Incidentally, in the present invention, the electric resistance of the surface of the disc is measured according to JIS-K6911 under the conditions of applied voltage of 100 V, atmosphere temperature of 23° C., and relative humidity (RH) of 50% by using "RESISTIVITY CHAMBER" R12704 (trade name), manufactured by Advantest Corporation (diameter of main electrode: 50 mm, inner diameter of guard ring: 70 mm, outer diameter of guard ring: 80 mm, counter electrode: 110 mm×110 mm), and "DIGITAL ULTRA HIGH RESISTANCE METER R834OA" (trade name) manufactured by Advantest Corporation.

The electric resistance on the reflective layer is measured in an atmosphere with atmosphere temperature of 23° C. and a relative humidity (RH) of 50% using "DIGITAL HI TESTER 3256" (trade name) manufactured by Hioki E. E. Corporation wherein the distance between the probes is set at 1 cm.

In the present invention, the treated layer is provided on the surface on which the signal-recording layer is formed. From the viewpoint of being able to further uniformly and electrically transfer the toner images to the disc by means of conventional electrophotography, it is particularly desired that the treated layer is provided on the entire surfaces of the disc.

Examples of the methods for forming the treated layer include, for instance, sputtering deposition method, coating method, and the like. These methods may be used alone, or in combination of two or more kinds as occasion demands. Incidentally, among these methods, from the viewpoint of being able to uniformly form the treated layer, the coating method is particularly desirably employed in the present invention.

In the sputtering deposition method, the conductive materials for forming the treated layer may be those having an electro-conductivity of at least $1\times10^{-6}$ S/m. Concrete examples of the electro-conductive materials include, for instance, metals, such as aluminum, iron, cobalt, nickel, gold, silver, copper, zinc, tin, titanium, chromium, manganese, indium, and tungsten; nonmetals, such as carbon and boron; semiconductors, such as silicon and germanium; conductive polymeric compounds, such as polythiazyls and polyacetylenes; inorganic compounds, such as tin oxide, zinc oxide, titanium oxide, indium-tin oxide, titanium nitride, and titanium carbide; mixtures, such as a mixture of aluminum powder and silicone dioxide powder, and a mixture of aluminum powder and alumina powder.

The sputtering deposition method can be carried out 20 by using the above conductive materials as a target (a base) in a conventionally used sputtering machine.

In addition, in the coating method, examples of the materials for forming a treated layer include, for instance, surfactants and priming inks.

In the case where a treated layer made of a surfactant is formed by the coating method, for instance, a method of applying a surfactant to the surface of a disc can be employed.

It is desired that the surfactant is at least one member selected from the group consisting of cationic surfactants, anionic surfactants, and amphoteric surfactants.

Concrete examples of the surfactants include, for instance, cationic surfactants, such as aliphatic quaternary ammonium salts and aliphatic amine salts; anionic surfactants such as sulfonates, carboxylates, sulfuric acid esters, and phosphoric acid esters; and amphoteric surfactants, such as imidazoline derivatives, including 2-alkylimidazolines, and aminocarboxylates, and the present invention is not limited to the exemplified ones. Incidentally, these surfactants can be used singly or in a combination of two or more kinds. Among these surfactants, since the use of the cationic surfactants, such as aliphatic quaternary ammonium salts and aliphatic amine salts, gives excellent transferability of the toner, they are particularly desirably used in the present invention.

Even a small amount of the surfactants gives sufficient electro-conductivity. In consideration of the paintability to the disc, the surfactant can be used after diluting with a solvent which does not impart mal-affects to the disc, such as water, ethanol, or a mixed solvent of water and ethanol.

Examples of the methods for applying the surfactant to the disc include, for instance, impregnation method, spray-coating method, brush coating method, roll coating method, and the like, and the present invention is not limited to the exemplified ones.

The concentration of the surfactant is not particularly limited, and any concentration can be used as long as the electric resistance of the surface of the disc takes a given value.

However, in cases where the concentration of the surfactant is high or where the surfactant is applied in large amounts, the parts of the printing device contacting with the disc may be contaminated by the applied surfactants in some cases, which may cause poor performance in printing or give poor light transmittance of the disc. Therefore, it is desired that the concentration of the surfactant is adjusted as low as possible, and that the amount of the surfactant is adjusted as small as possible within the surface electric resistance of $1\times10^{13}$ to $1\times10^{3}$ Ω, preferably from $1\times10^{12}$ to $1\times10^{4}$ Ω, more preferably $1\times10^{10}$ to $1\times10^{6}$ Ω. The surfactant is usually used after diluting to a concentration of several percent by weight or less.

After the surfactant is applied to the disc, the surfactant may be dried naturally or by means, such as air blowing, particularly hot air blowing.

In the case where a treated layer made of a priming ink is formed by the coating method, for instance, a method of coating a priming ink on the surface of the disc can be employed.

Examples of the priming inks include, for instance, UV-curable inks, solvent-based inks, and the like. These inks can be used alone or in admixture thereof.

It is desired that the priming ink contains at least one of electro-conductive fillers and surfactants in order to give electro-conductivity.

Representative examples of the UV-curable inks are, for instance, UV-curable inks including an electro-conductive filler, UV-curable inks including a surfactant, and the like.

In the UV-curable inks including an electro-conductive filler, the electro-conductive filler can be any of metal-based electro-conductive fillers and nonmetal-based electro-conductive fillers.

Examples of the metal-based electro-conductive fillers include, for instance, electro-conductive fillers made of a metal, such as gold, silver, copper, aluminum, or nickel, and electro-conductive fillers made of an alloy of these metals.

Examples of the nonmetal-based electro-conductive fillers include, for instance, electro-conductive fillers made of nonmetal materials, such as zinc oxide, aluminum boride, barium sulfate, titanium oxide, tin oxide, potassium titanate, zinc oxide, indium oxide, indium-tin oxide (ITO), antimony-tin oxide (ATO), and the like.

The shape of the electro-conductive filler is not particularly limited, any of spherical and non-spherical ones may be used. Among the electro-conductive fillers having the above shapes, from the viewpoint of easily forming a two-dimensional, electro-conductive chain on the coated surface and lowering the surface electric resistance of the coated surface in a little amount of the electro-conductive filler, acicular electro-conductive fillers having an aspect ratio (maximum length (L)/diameter (D)) of at least 2 can be desirably used in the present invention.

The sizes of the electro-conductive fillers differ depending upon their shapes, and the like. It is desired that the average length is usually from 0.1 to 10 $\mu$m or so.

From the viewpoint of forming excellent fixed images by means of electrophotography on the coating layer formed by applying the resulting UV-curable ink, it is desired that the electric resistance of the electro-conductive filler is at most $1\times10^{10}$ Ω.

Incidentally, the electro-conductive filler can be used in the same manner as the pigments which have been conventionally used in coloring UV-curable inks.

The content of the electro-conductive filler in the UV-curable ink is not particularly limited, provided that the content is adjusted to give a desired surface electric resistance. From the viewpoint of securely obtaining the desired surface electric resistance which can form fixed images with excellent transferability by subjecting the coated surface of the ink to electrophotography, it is desired that the content of the electro-conductive filler in the UV-curable ink is at least 5% by weight, preferably at least 7% by weight. In addition, from the viewpoint of having excellent curability and degree of curing when curing the applied surface of the ink with ultraviolet rays, it is desired that the content is at most 50% by weight, preferably at most 35% by weight.

In the UV-curable ink including the surfactant, the surfactant may be any of cationic surfactants, anionic surfactants, and amphoteric surfactants. These surfactants may be used alone or in combination of two or more.

Concrete examples of the surfactants can be the same as the surfactants which are used when forming the treated layer made of a surfactant by a coating method.

The content of the surfactant in the UV-curable ink is not particularly limited, provided that the content is adjusted to give a desired surface electric resistance.

From the viewpoint of securely obtaining a desired surface electric resistance which can form fixed images with excellent transferability by subjecting the coated surface of the ink to electrophotography, it is desired that the content of the surfactant in the UV-curable ink is at least 0.1% by weight, preferably at least 2% by weight.

In addition, from the viewpoint of having excellent curability and degree of curing when curing the applied surface of the ink with ultraviolet rays, it is desired that the content is at most 30% by weight, preferably at most 25% by weight.

The UV-curable inks which can be used in the UV-curable ink including the electro-conductive filler, and the UV-curable ink including the surfactant mentioned above may be any of conventionally used ones.

The UV-curable inks include UV-curable resins which have been generally used for undercoats for optical discs, UV-curable inks which have been used in screen printing and offset printing.

The UV-curable resin generally comprises a polymerizable resin, a cut monomer, a photo-polymerization initiator, and other additives.

Concrete examples of monomers which are used in the polymerizable resin include, for instance, acrylic acid ester, epoxy acrylates, urethane acrylates, polyester acrylates, polyether acrylates, alkyd acrylates, polyol acrylates, polyurethane acrylates, melanin acrylate, and the like.

The cut monomers include, for instance, monoacrylates, diacrylates, triacrylates, and the like. The cut monomer can be used for adjusting viscosity.

The photopolymerization initiators include, for instance, benzoin, acetophenone, benzyl ketal, and the like.

The additives usually include additives which have been added to improve the storage stability of the ink or dispersibility of the pigments, conventional inorganic pigments and organic pigments, additives conventionally used for colored UV-curable ink, and the like.

The method for preparing the UV-curable ink is not particularly limited, and it may be similar to the method for preparing conventional UV-curable inks.

Incidentally, the UV-curable ink can be used by mixing with other inks as occasion demands.

The method for coating the UV-curable ink on a disc is not particularly limited. Concrete examples of such methods include, for instance, spin coater method, screen printing method, offset printing method, pad printing method, roller coating method, and the like.

The thickness of the coating layer formed by coating the UV-curable ink on a disc is not particularly limited. In consideration of coating layer strength and surface smoothness, it is desired that the thickness of the coating layer is from 5 to 20 $\mu$m or so.

The solvent-based inks include, for instance, solvent-based inks which have been used in screen printing and offset printing. The solvent-based ink generally comprises a pigment, a resin, a solvent, and additives. Examples of the resins include, for instance, acrylic resins, polyamide-based resins, polyester-based resins, and the like. Examples of the solvents include, for instance, organic solvents, such as aliphatic hydrocarbon-based solvents, aromatic hydrocarbon-based solvents, ketones, glycol esters, glycol ethers, esters, and the like. As in the case of the UV-curable ink, the electro-conductivity can be imparted to the solvent-based ink by adding thereto an electro-conductive filler, a surfactant, and the like.

The method for coating the solvent-based ink on a disc is not particularly limited. Concrete examples of the methods include, for instance, spin coater method, screen printing method, offset printing method, pad printing method, roller coating method, and the like.

The thickness of the coating layer formed by coating the solvent-based ink to a disc is not particularly limited. In consideration of coating layer strength and surface smoothness, it is desired that the thickness of the coating layer is from 5 to 20 $\mu$m or so.

After the treated layer having a surface electric resistance of $1\times10^{13}$ to $1\times10^{3}$ $\Omega$ is thus formed, electrophotographic printing can be carried out on the treated layer by means of electrophotography.

The electrophotographic printing can be carried out, for instance, by loading a conventionally used toner to a generally employed laser beam printer.

In the case where the laser beam printer is used, for instance, its fixing portion is removed, and the clearance between the upper and lower feeding rollers for feeding an object to be printed can be adjusted according to the thickness of the disc in order not to cause any hinderance when passing the disc therethrough. In addition, the clearance between a supporting member of the toner images (a transfer belt) of the transfer portion and a transfer roller can be adjusted in order to reduce the stress upon the contact therebetween.

In addition, in order to be able to desirably adjust the transfer voltage upon transferring the toner images to a disc, it is desired that a high-voltage source is provided at the external portion of the laser beam printer. The transfer voltage and current are not particularly limited. Usually, it is desired that the transfer voltage is from 0 V to 6 kV or so, and the current is from 0.5 to 5 mA or so, and that switching of polarity can be carried out.

In addition, in order to be able to easily adjust the fixing temperature upon fixing the toner images on the disc, for instance, it is desired that a thermocouple for detecting a surface temperature is attached to the surface of a heat roller in the removed fixing portion of the laser beam printer, and that the surface temperature is adjusted by a temperature controller. In addition, the nip pressure can be adjusted by, for instance, selecting a suitable spring and adjusting the pressing force of a pressing roller to have a desired value. The conveying speed of the printing device can be adjusted by, for instance, modifying the device so that a given driving force can be given to the heat roller with a speed-adjustable motor.

Thus, the electrophotographic printing can be carried out by means of electrophotography on the treated layer of the optical disc.

As described above, the printed images on the optical disc subjected to electrophotography are free from transfer deficiency and disrupted images, and thus have high quality.

Next, the method of producing an optical disc of the present invention will be explained based on the drawings.

FIG. 1 is a schematic view showing one embodiment of an apparatus 1 for manufacturing an optical disc which can be used in the method for producing an optical disc of the present invention.

In FIG. 1, the apparatus 1 for manufacturing an optical disc mainly comprises a treated layer-forming device 2 for forming a treated layer. In the case where an optical disc 5 is subjected to electrophotographic printing, an electrophotographic printing device 3 is used. In FIG. 1, the numeral 4 denotes a holder for conveying a disc 5 previously having a reflective layer (not illustrated) and a protective layer (not illustrated) as occasion demands to the treated layer-forming device 2 and the electrophotographic printing device 3. The holder 4 is engaged with a feed screw 7 which is driven by a turbomotor 6. By driving the turbomotor 6, the disc 5 can be sequentially conveyed to the treated layer-forming device 2 and the electrophotographic printing device 3 in the direction shown by an arrow A through the holder 4.

The treated layer-forming device 2 is a device for forming a treated layer on a signal recording layer of the disc 5.

The electrophotographic printing device 3 is a device for controlling the drives of an image-forming device and a transfer device in accordance with the printed data converted from the image data prepared, for instance, by using a computer (not illustrated). By transferring powder or colored toners onto the treated layer of the disc 5 with the electrophotographic printing device 3, printed images can be formed.

An optical disc 8 with printed images is then released from the holder 4. The resulting optical disc has a structure, for instance, as shown in FIG. 2.

Figure 2:
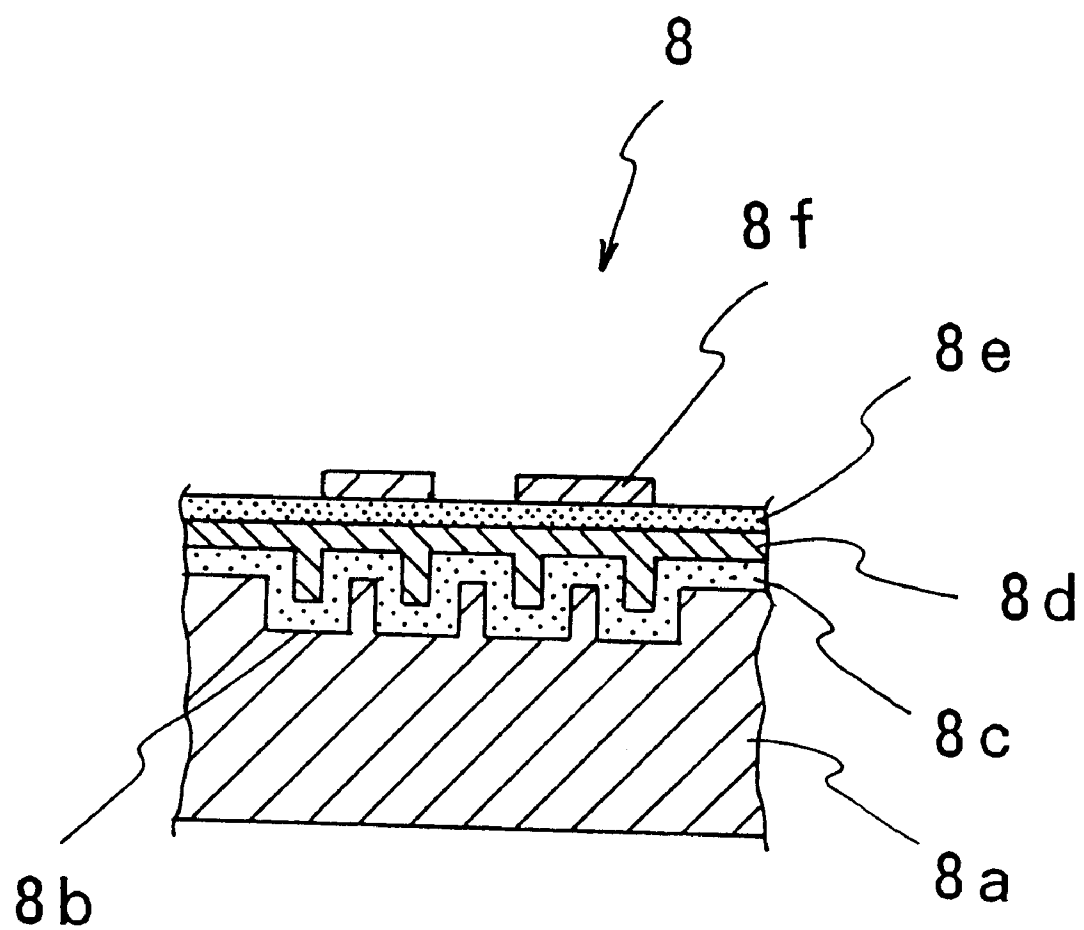
FIG. 2 is a schematic cross-sectional view of an optical disc obtained by the method for producing an optical disc of the present invention.

FIG. 2 is a cross-sectional view of the optical disc 8. In FIG. 2, the optical disc 8 has a disc substrate **8*a*, a signal-recording layer 8*b* is formed thereon, a reflective layer 8*c* is formed on the signal-recording layer 8*b*, and, as occasion demands, a protective layer 8*d* is formed on the reflective layer 8*c*. A treated layer 8*e* is formed on the protective layer 8*d*, and an electrophotographic printing 8*f* is provided on the treated layer 8*e***.

Figure 3:
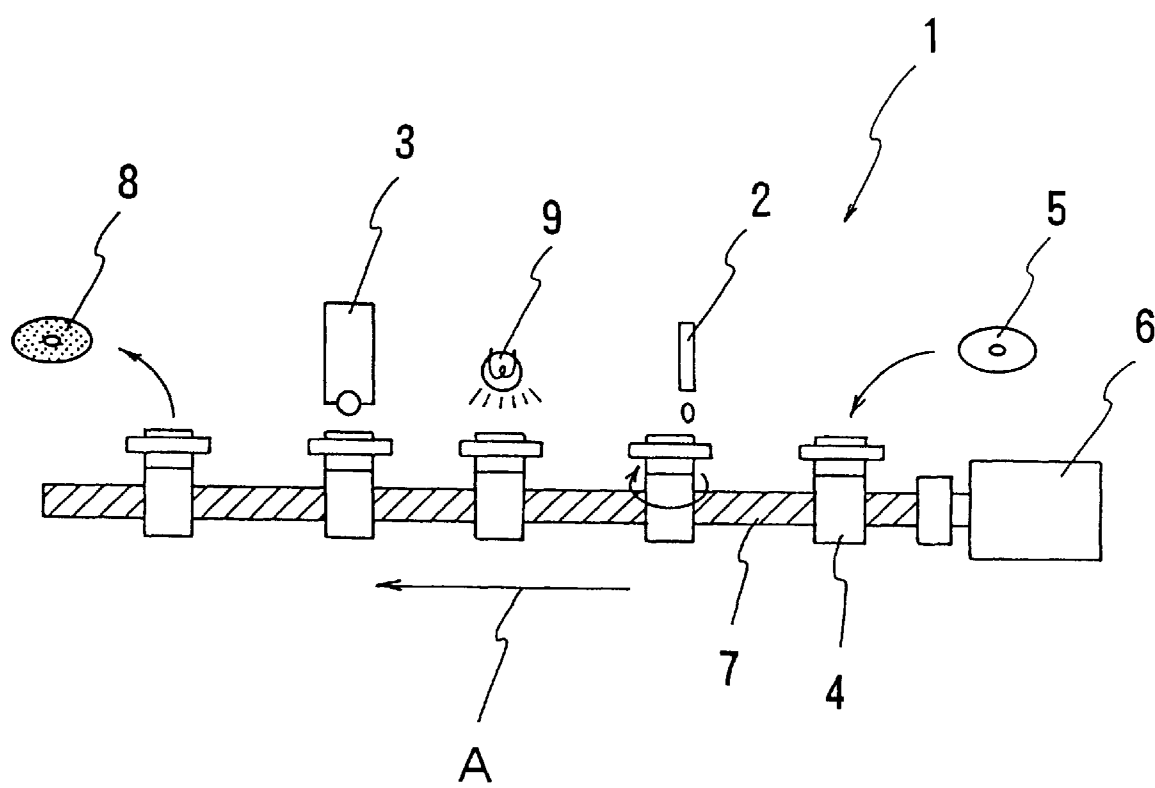
FIG. 3 is a schematic view showing another embodiment of an apparatus for manufacturing an optical disc which can be used for the method for producing an optical disc of the present invention.

FIG. 3 is a schematic view showing another embodiment of an apparatus for manufacturing an optical disc which can be used in the method for producing an optical disc of the present invention.

In FIG. 3, the apparatus 1 for manufacturing an optical disc mainly comprises a treated layer-forming device 2 for forming a treated layer. In the case where an optical disc 5 is subjected to electrophotographic printing, an electrophotographic printing device 3 is provided. In FIG. 3, the numeral 4 denotes a holder for conveying a disc 5 previously having a reflective layer to the treated layer-forming device 2, a device 9 for curing the treated layer, and the electrophotographic printing device 3. The holder 4 is engaged with a feed screw 7 which is driven by a turbomotor 6. By driving the turbomotor 6, the disc 5 can be sequentially conveyed to the treated layer-forming device 2, the device 9 for curing the treated layer, and the electrophotographic printing device 3 in the direction shown by an arrow A through the holder 4.

The treated layer-forming device 2 is a device for forming a treated layer on a signal recording layer of the disc 5.

The device 9 for curing the treated layer comprises, for instance, a UV irradiation lamp, and the like, and the device 9 is used for curing the treated layer formed by the treated layer-forming device 2.

The electrophotographic printing device 3 is a device for controlling the drives of an image-forming device and a transfer device in accordance with the printed data converted from the image data prepared, for instance, by using a computer (not illustrated). By transferring powder or colored toners onto the treated layer of the disc 5 with the electrophotographic printing device 3, printed images can be formed.

An optical disc 8 with printed images is then released from the holder 4. The resulting optical disc has a structure, for instance, as shown in FIG. 4.

Figure 4:
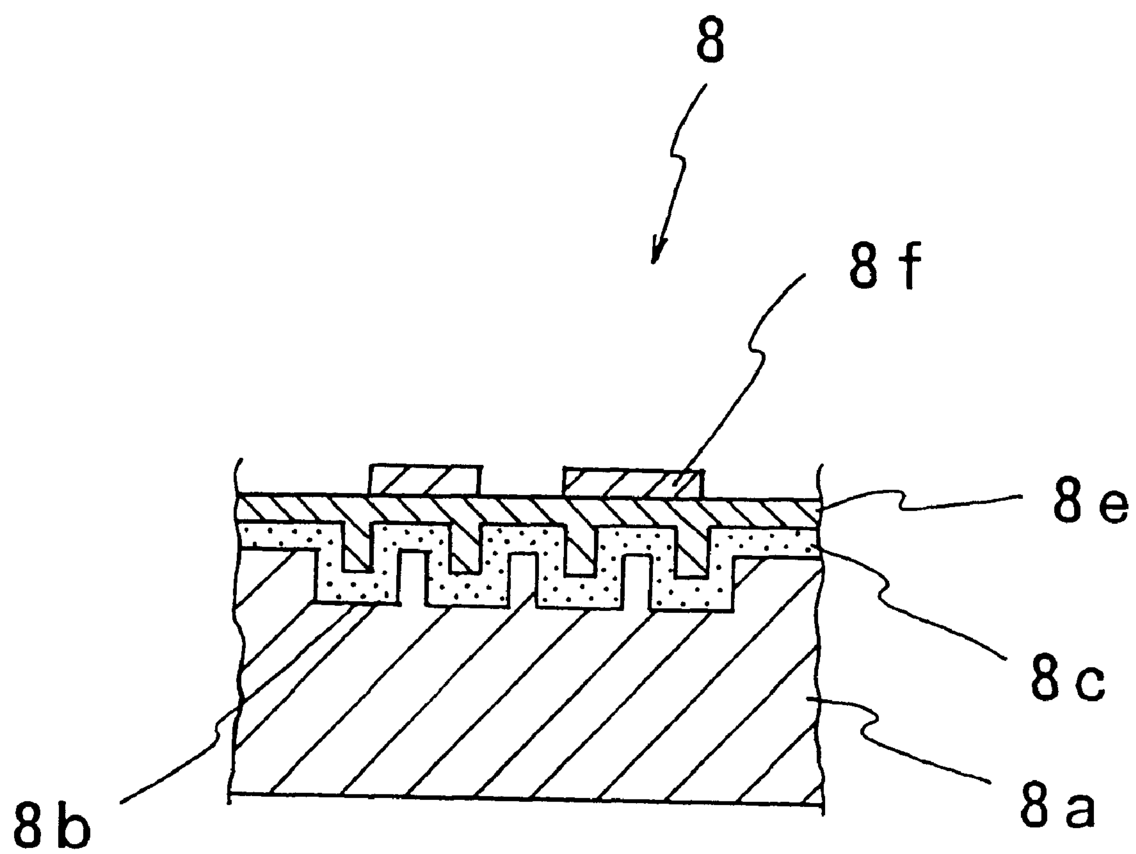
FIG. 4 is a schematic cross-sectional view of another embodiment of an optical disc obtained by the method for producing an optical disc of the present invention.

FIG. 4 is a cross-sectional view of the optical disc 8. In FIG. 4, the optical disc 8 has a disc substrate 8*a*, and a signal-recording layer 8*b* is formed thereon, and a reflective layer 8*c* is formed on the signal-recording layer 8*b*. A treated layer 8*e* is formed on the reflective layer 8*c*, and an electrophotographic printing 8*f* is provided on the treated layer 8*e*.

Incidentally, in the apparatus for manufacturing an optical disc shown in FIG. 1 and FIG. 3, the treated layer-forming device 2 and the device 9 for curing the treated layer are combined in one body. However, in the present invention, the treated layer-forming device 2 and the device 9 for curing the treated layer can be separately provided, not being combined in one body.

Next, the method for producing an optical disc of the present invention will be described in further detail based on the examples, without intending to limit the present invention to only these examples.

Production Example 1 [Production of Disc]

A reflective layer was formed on a disc substrate (outer diameter: 120 mm, thickness: 1.2 mm) made of a polycarbonate by vapor deposition of aluminum. Thereafter, in order to prevent oxidation of the reflective layer, an anti-oxidation layer (thickness: 10 μm or so) was formed with a UV-curable acrylic resin, to give Disc A.

Production Example 2 [Production of Disc]

A reflective layer was formed on a disc substrate (outer diameter: 120 mm, thickness: 1.2 mm) made of a polycarbonate by vapor deposition of aluminum, to give Disc B.

Incidentally, in the following examples, the electric resistance of the front surface (surface to be printed) and the reverse surface of the discs other than Disc B means the value measured under the conditions of applied voltage of 100 V, atmosphere temperature of 23° C., and relative humidity (RH) of 50% by using "RESISTIVITY CHAMBER R12704" (trade name), manufactured by Advantest Corporation, and "DIGITAL ULTRA HIGH RESISTANCE METER R834OA" (trade name) manufactured by Advantest Corporation.

The electric resistance of the surface of Disc B (surface to be printed) means the value measured in an atmosphere having an atmosphere temperature of 23° C. and a relative humidity (RH) of 50% by using "DIGITAL HI TESTER 3256" (trade name) manufactured by Hioki E. E. Corporation wherein the distance between the probes is set at 1 cm.

I. Formation of Treated Layer Made of Surfactant

Example I-1

A quaternary ammonium salt-based surfactant ("ELECTROSTRIPPER QN" (trade name) manufactured by Kao Corporation), a cationic surfactant, diluted with ethanol to have a concentration of 1% by weight was used, and Disc A was dipped in the above surfactant solution (solution temperature: 18° C.) for ten seconds to coat the entire surface of the disc with the surfactant, and the coated Disc A was air-dried.

The electric resistance of the surface of the resulting disc (surface to be printed) and its reverse surface were measured. As a result, the electric resistance was $2.5\times10^8$ Ω.

Example I-2

The same procedures as in Example I-1 were carried out to apply a surfactant except for using, as a surfactant solution, a sulfonate-based surfactant ("LATEMUL PS" (trade name) manufactured by Kao Corporation), an anionic surfactant, diluted with ethanol to have a concentration of 1% by weight.

The electric resistance of the surface (surface to be printed) and the reverse surface of this disc were measured. As a result, the electric resistance was $2.5\times10^8$ Ω.

Example I-3

The same procedures as in Example I-1 were carried out to apply a surfactant except for using, as a surfactant solution, a 2-alkylimidazoline derivative-based surfactant ("ELECTROSTRIPPER AC" (trade name) manufactured by Kao Corporation), an amphoteric surfactant, diluted with ethanol to have a concentration of 1% by weight.

The electric resistance of the surface (surface to be printed) and the reverse surface of the obtained disc were measured. As a result, the electric resistance was $2.5\times10^{10}$ Ω.

II. Formation of Treated LaVer Made of Conductive Filler-Containing Priming Ink

Example II-1

Seventy-five parts by weight of a UV-curable ink ("AQUA UV MAX" (trade name) manufactured by Teikoku Printing Inks Manufacturing Co., Ltd.) and 25 parts by weight of acicular, conductive titanium oxide ("FT-3000" (trade name) manufactured by Ishihara Sangyo Kaisha, Ltd.; aspect ratio: 19.1; electric resistance: 30 Ω) were stirred for 30 minutes in a homomixer, to give a UV-curable ink.

The resulting UV-curable ink was applied onto Disc A to form a dry film having a thickness of about 10 μm by means of screen printing (screen ruling: 300 mesh).

The electric resistance of the surface (surface to be printed) of the resulting disc was measured. As a result, the electric resistance was $4.7\times10^6$ Ω.

Example II-2

82.5 parts by weight of a UV-curable ink ("AQUA UV MAX" (trade name) manufactured by Teikoku Printing Inks Manufacturing Co., Ltd.) and 17.5 parts by weight of acicular, conductive titanium oxide ("FT-3000" (trade name) manufactured by Ishihara Sangyo Kaisha, Ltd.; aspect ratio: 19.1; electric resistance: 30 Ω) were stirred for 30 minutes in a homomixer, to give a UV-curable ink.

A coating film was formed in the same manner as in Example II-1 using the resulting UV-curable ink.

The electric resistance of the surface (surface to be printed) of the resulting disc was measured. As a result, the electric resistance was $1.4\times10^8$ Ω.

Example II-3

Ninety parts by weight of a UV-curable ink ("AQUA UV MAX" (trade name) manufactured by Teikoku Printing Inks Manufacturing Co., Ltd.) and 10 parts by weight of acicular, conductive titanium oxide ("FT-3000" (trade name) manufactured by Ishihara Sangyo Kaisha, Ltd.; aspect ratio: 19.1; electric resistance: 30 Ω) were stirred for 30 minutes in a homomixer, to give a UV-curable ink.

A coating film was formed in the same manner as in Example II-1 using the resulting UV-curable ink.

The electric resistance of the surface (surface to be printed) of the resulting disc was measured. As a result, the electric resistance was $2.9\times10^{12}$ Ω.

Example II-4

Ninety-five parts by weight of a UV-curable ink ("AQUA UV MAX" (trade name) manufactured by Teikoku Printing Inks Manufacturing Co., Ltd.) and 5 parts by weight of acicular, conductive titanium oxide ("FT-3000" (trade name) manufactured by Ishihara Sangyo Kaisha, Ltd.; aspect ratio: 19.1; electric resistance: 30 Ω) were stirred for 30 minutes in a homomixer, to give a UV-curable ink.

A coating film was formed in the same manner as in Example II-1 using the resulting UV-curable ink.

The electric resistance of the surface (surface to be printed) of the resulting disc was measured. As a result, the electric resistance was $1.0 \times 10^{13}$ Ω.

III. Formation of Treated Layer Made of Surfactant-Containing Priming Ink

Example III-1

Seventy-five parts by weight of a UV-curable ink ("AQUA UV MAX" (trade name) manufactured by Teikoku Printing Inks Manufacturing Co., Ltd.) and 25 parts by weight of alkyldimethylethanolammonium glycolate ("COATAMINE 86EG" (trade name) manufactured by Kao Corporation), a cationic surfactant, were stirred for 30 minutes in a homomixer, to give a UV-curable ink.

The resulting UV-curable ink was applied onto Disc B to form a dry film having a thickness of about 10 $\mu$m by means of screen printing (screen ruling: 300 mesh).

The electric resistance of the surface (surface to be printed) of the resulting disc was measured. As a result, the electric resistance was $6.1 \times 10^{6}$ Ω.

Example III-2

82.5 parts by weight of a UV-curable ink ("AQUA UV MAX" (trade name) manufactured by Teikoku Printing Inks Manufacturing Co., Ltd.) and 17.5 parts by weight of alkyldimethylethanolammonium glycolate ("COATAMINE 86EG" (trade name) manufactured by Kao Corporation), a cationic surfactant, were stirred for 30 minutes in a homomixer, to give a UV-curable ink.

A coating film was formed in the same manner as in Example III-1 using the resulting UV-curable ink.

The electric resistance of the surface (surface to be printed) of the resulting disc was measured. As a result, the electric resistance was $2.6 \times 10^{8}$ Ω.

Example III-3

Ninety parts by weight of a UV-curable ink ("AQUA UV MAX" (trade name) manufactured by Teikoku Printing Inks Manufacturing Co., Ltd.) and 10 parts by weight of alkyldimethylethanolammonium glycolate ("COATAMINE 86EG" (trade name) manufactured by Kao Corporation), a cationic surfactant, were stirred for 30 minutes in a homomixer, to give a UV-curable ink.

A coating film was formed in the same manner as in Example III-1 using the resulting UV-curable ink.

The electric resistance of the surface (surface to be printed) of the resulting disc was measured. As a result, the electric resistance was $7.4 \times 10^{12}$ Ω.

Example III-4

Ninety-eight parts by weight of a UV-curable ink ("AQUA UV MAX" (trade name) manufactured by Teikoku Printing Inks Manufacturing Co., Ltd.) and 2 parts by weight of alkyldimethylethanolammonium glycolate ("COATAMINE 86EG" (trade name) manufactured by Kao Corporation), a cationic surfactant, were stirred for 30 minutes in a homomixer, to give a UV-curable ink.

A coating film was formed in the same manner as in Example III-1 using the resulting UV-curable ink.

The electric resistance of the surface (surface to be printed) of the resulting disc was measured. As a result, the electric resistance was $8.9 \times 10^{12}$ Ω.

Example III-5

Ninety-eight parts by weight of a UV-curable ink ("AQUA UV MAX" (trade name) manufactured by Teikoku Printing Inks Manufacturing Co., Ltd.) and 2 parts by weight of a sodium salt of a polyoxyethylene laurylether sulfate ("EMAL 20C" (trade name) manufactured by Kao Corporation), an anionic surfactant, were stirred for 30 minutes in a homomixer, to give a UV-curable ink.

A coating film was formed in the same manner as in Example III-1 using the resulting UV-curable ink.

The electric resistance of the surface (surface to be printed) of the resulting disc was measured. As a result, the electric resistance was $7.5 \times 10^{12}$ Ω.

IV. Formation of Treated Layer by Sputtering Deposition Method

Example IV-1

A treated layer of aluminum (purity: 99.99%) as a target (base) having a thickness of from 10 to 30 nm was formed on Disc A by film-forming on Disc A for one to five seconds at a sputtering voltage of 500 W in argon gas atmosphere with a sputtering machine ("CDI 911" (trade name) manufactured by Balzers-Hakuto Co., Ltd.).

The electric resistance of the surface (surface to be printed) of the resulting disc was measured. As a result, the electric resistance was $1.5 \times 10^{3}$ Ω.

Comparative Example 1

The electric resistance of the surface (surface to be printed) of Disc A was measured. As a result, the electric resistance was $1 \times 10^{14}$ Ω.

Comparative Example 2 [Coating on Disc A]

Only the TV-curable ink ("AQUA UV MAX" (trade name) manufactured by Teikoku Printing Inks Manufacturing Co., Ltd.) was stirred for 30 minutes in a homomixer, to give a UV-curable ink.

A coating film was formed in the same manner as in Example II-1 using the resulting UV-curable ink.

The electric resistance of the surface (surface to be printed) of the resulting disc was measured. As a result, the electric resistance was $3.2 \times 10^{15}$ Ω.

Comparative Example 3 [Coating on Disc B]

Only the UV-curable ink ("AQUA UV MAX" (trade name) manufactured by Teikoku Printing Inks Manufacturing Co., Ltd.) was stirred for 30 minutes in a homomixer, to give a UV-curable ink.

Images were formed in the same manner as in Example III-1 using the resulting UV-curable ink. The surface electric resistance was measured and found to be $2.2 \times 10^{14}$ Ω.

Comparative Example 4

The electric resistance of the surface (surface to be printed) of Disc B was measured. As a result, the electric resistance was 1.3×10 Ω. Incidentally, the thickness of the reflective layer was about 50 nm.

Testing Example [Evaluation of Printing Properties]

A printing device, a color-laser beam printer (commercially available from Sony/Tektronix under the trade name of Phaser "550J") was modified by taking out its fixing portion, and spreading the clearance of the portion where the disc is passed through so that the disc can be easily conveyed therethrough. In addition, in order to transfer toner images formed by a toner (a negative chargeable toner, genuine parts for "Phaser 550J" (trade name) manufactured by Sony/Tektronix) from a supporting member for toner images (a transfer belt) to an object to be printed, an external high-voltage source was connected with a transfer roller (attached to the printing device) for supplying electric charges for the disc in contact with the surface of the disc, which is reverse to the surface where printing was carried out, to make supplying voltages and the like, adjustable.

In addition, in the heat roller arranged in the removed fixing portion, in order to desirably adjust its conveying speed, a speed-controlling motor was provided as a driving means. In addition, in order to make it possible to adjust the fixing temperature to a given temperature, a thermocouple was attached to the heat roller surface, so that its fixing temperature could be adjusted to a given temperature by a temperature-controlling unit. In addition, a printing device (external fixing device) controllable the nip pressure by adjusting pressing force of the pressing roller exerted to the heat roller with a spring is used.

The supplied voltage applied to the transfer roller for transferring the toner images to the disc had a polarity reverse to the toner, and its optimum range was determined by making adjustments for each sample disc.

The toner images transferred to the surface of the disc were fixed by passing the disc twice through the printing device (an external fixing device) while controlling the feeding speed of the disc to 30 mm/sec, the surface temperature of the heat roller was adjusted to 160° C., and the nip pressure when no discs being passed through was adjusted to 10 kg/cm.

Incidentally, a comparative printed material was prepared by printing plain papers (basis weight: 60 to 120 g/m$^2$) which have been generally widely used with a color laser beam printer (commercially available from Sony/Tektronix under the trade name of "Phaser 550J") without any modification.

Next, the discs having a formed treated layer and the comparative printed materials were examined by ten males and ten females of the age group of from 20 to 50 years old with respect to printing deficiency, image disorder, and blurred images based on the following evaluation standards. The results are shown in Table 1.

[Evaluation Standards]

Rank A: Little differences in printing properties can be observed between the label-printed discs and the comparative printed material.

Rank B: The comparative printed material shows superior printing properties.

TABLE 1

| Example No. | Kinds of Treated Layer | Surface Electric Resistance (Ω) | Supplied Voltage (V) | Evaluation Results of Printing Properties (Number of Persons) Rank A | Rank B |
|---|---|---|---|---|---|
| I-1 | Surfactant | $2.5 \times 10^8$ | +750 | 20 | 0 |
| I-2 | | $2.5 \times 10^8$ | +750 | 18 | 2 |
| I-3 | | $2.5 \times 10^{10}$ | +750 | 18 | 2 |
| II-1 | Electro- | $4.7 \times 10^6$ | +750 | 20 | 0 |
| II-2 | Conductive | $1.4 \times 10^8$ | +750 | 20 | 0 |
| II-3 | Filler | $2.9 \times 10^{12}$ | +750 | 18 | 2 |
| II-4 | | $1.0 \times 10^{13}$ | +750 | 16 | 4 |
| III-1 | Surfactant- | $6.1 \times 10^6$ | +750 | 20 | 0 |
| III-2 | Containing | $2.6 \times 10^8$ | +750 | 20 | 0 |
| III-3 | Priming Ink | $7.4 \times 10^{12}$ | +750 | 18 | 2 |
| III-4 | | $8.9 \times 10^{12}$ | +750 | 17 | 3 |
| III-5 | | $7.5 \times 10^{12}$ | +750 | 17 | 3 |
| IV-1 | Sputtering Deposition | $1.5 \times 10^3$ | +300 | 13 | 7 |
| Comparative Example | | | | | |
| 1 | None | $1.0 \times 10^{14}$ | +3000 | 0 | 20 |
| 2 | | $3.2 \times 10^{15}$ | +3000 | 0 | 20 |
| 3 | | $2.2 \times 10^{14}$ | +3000 | 0 | 20 |
| 4 | | $1.3 \times 10$ | +100 | 0 | 20 |

From the results shown in Table 1, it can be seen that since the treated layer is formed on the optical disc obtained in each of the examples, toner images can be electrically uniformly transferred to the optical disc by means of electrophotography.

INDUSTRIAL APPLICABILITY

Since toner images are electrically uniformly transferred to the optical disc of the present invention by means of electrophotography, the optical disc can be desirably used as an optical disc, in which digital signals can be recorded, reproduced or erased, such as a digital audio disc, such as a compact disc, a video disc, or a CD-ROM.

In addition, according to the method for producing an optical disc of the present invention, there can be obtained an optical disc having electrically uniformly transferred toner images by means of electrophotography.

In addition, by using an apparatus for manufacturing an optical disc of the present invention, toner images can be electrically uniformly transferred to an optical disc by means of electrophotography.

We claim:

1. An optical disc comprising a signal-recording layer, a treated layer on the signal-recording layer, and toner on said treated layer wherein said treated layer has a surface electric resistance of from $1\times10^{13}$ to $1\times10^{1}$ Ω.

2. The optical disc of claim 1, wherein said treated layer is provided on a reflective layer formed on the signal-recording layer.

3. The optical disc of claim 2, wherein said treated layer is provided on a protective layer formed on the reflective layer.

4. The optical disc of claim 1, wherein the surface electric resistance of said treated layer is from $1\times10^{2}$ to $1\times10^{4}$ Ω.

5. The optical disc of claim 1, wherein said treated layer is formed by at least one method of a sputtering deposition method and a coating method.

6. The optical disc of claim 1, wherein said treated layer comprises a surfactant.

7. The optical disc of claim 6, wherein the surfactant is at least one member selected from the group consisting of cationic surfactants, anionic surfactants and amphoteric surfactants.

8. The optical disc of claim 1, wherein said treated layer is formed by at least one priming ink of UV-curable inks and solvent-based inks.

9. The optical disc of claim 8, wherein the UV-curable ink contains at least one of an electro-conductive filler and a surfactant.

10. A method for producing an optical disc, the method comprising forming atreated layer having a surface electric resistance of from $1\times10^{13}$ to $1\times10^{3}$ Ω on a signal-recording layer of the optical disc, and electrophotographically printing toner on said treated layer.

11. The method for producing an optical disc of claim 10, comprising providing said treated layer on a reflective layer which is formed on the signal-recording layer.

12. The method for producing an optical disc of claim 11, comprising forming a protecting layer on the reflective layer, and providing said treated layer on the protective layer.

13. The method for producing an optical disc of claim 10, wherein the surface electric resistance of said treated layer is from $1\times10^{12}$ to $1\times10^{4}$ Ω.

14. The method for producing an optical disc of claim 10, wherein said treated layer is formed by at least one method selected from a sputtering deposition method and a coating method.

15. An apparatus for manufacturing an optical disc, the apparatus comprising a treated layer-forming apparatus that forms a treated layer on a signal-recording layer of the optical disc, and an electrophotographic printer that prints toner on said treated layer.

* * * * *